United States Patent [19]

Cook et al.

[11] 3,899,589

[45] Aug. 12, 1975

[54] METHOD AND COMPOSITIONS FOR INDUCING RESISTANCE TO BACTERIAL INFECTIONS

[75] Inventors: Elton S. Cook; Kinji Tanaka, both of Cincinnati, Ohio

[73] Assignee: Stanley Drug Products, Inc., Portland, Oreg.

[22] Filed: Mar. 18, 1974

[21] Appl. No.: 452,370

Related U.S. Application Data

[60] Division of Ser. No. 138,331, April 28, 1971, Pat. No. 3,728,444, and a continuation of Ser. No. 341,079, March 14, 1973, abandoned.

[52] U.S. Cl. .......................................... 424/319
[51] Int. Cl.$^2$ .......................................... A61K 31/195
[58] Field of Search .......................................... 424/319

[56] References Cited

UNITED STATES PATENTS 3,728,444 4/1973 Cook et al. .......................... 424/315

OTHER PUBLICATIONS

Tsuchiya et al., Applied Microbiology, May 1970, pp. 813–817.

*Primary Examiner*—Jerome D. Goldberg
*Attorney, Agent, or Firm*—John G. Schenk

[57] ABSTRACT

A variety of substances are reported which alter host resistance to cocci and bacilli bacterial infections. Nevertheless, because of the extreme difficulty of total eradication, and the frequent reappearance of the same strains even after their apparently successful elimination, there is a continuing need for drugs for the treatment of coccic infections. Some amino sulfonic acids have been found effective in inducing resistance to infections due to cocci and bacilli.

3 Claims, No Drawings

METHOD AND COMPOSITIONS FOR INDUCING RESISTANCE TO BACTERIAL INFECTIONS

This application is a division of Ser. No. 138,331 filed Apr. 28, 1971 now U.S. Pat. No. 3,728,444 issued Apr. 17, 1973 and a continuation of Ser. No. 341,079 filed Mar. 14, 1971, now abandoned.

BACKGROUND OF THE INVENTION

This invention pertains to antimicrobials. In a particular aspect this invention relates to antimicrobials effective in protecting mammals against cocci and bacilli bacterial infections.

Bacteria such as cocci and bacilli are a unique group of organisms embodying within themselves an array of yet unanswered puzzles in biology, both fundamental and experimental. It is recognized that the significance of staphylococcal infections is not so much in severity, except in a few instances, as in the subtleties of the infection due to the unpredictable vagaries of these organisms. The result is that the disease continues to be a problem.

Treatment of staphylococcal diseases is complicated by the ability of the organisms to develop resistance. The magnitude of the problem is further amplified by the extreme difficulty of total eradication, and the frequent reappearance of the same strain even after apparently successful elimination. The inability to eliminate the carrier state by any of the currently known methods, and the prevalence of the new antibiotic resistant hospital strains have added new dimensions to the frustrating situation.

Penicillin G (benzyl penicillin) is still the drug of choice for the treatment of infections caused by susceptible coccic strains. However, numerous strains are known which elaborate an anzyme penicillinase in response to the drug and thus remain insensitive. This led to the development of semi-synthetic penicillins which are not inactivated by penicillinase. However, recently resistance of staphylococci to the newer penicillins has been reported. Hence there is a seemingly never ending demand for anticoccic factors.

A variety of substances are reported which alter host resistance to coccic infections. However, because of the ubiquitous nature of cocci and bacilli, and the diversification of their biological and biochemical characteristics, there is a continuing need for drugs for the treatment of coccic infections. Thus the existence of multiple antibiotic-resistant strains of the organism suggests the desirability of investigating other drugs for combatting the infection. This invention provides additional antimicrobials for the treatment of staphylococcic and bacillic infections.

SUMMARY OF THE INVENTION

A number of antibiotics contain amino acid residues. For this reason it was thought that natural alpha-amino acids found in proteins would express anticoccic properties, but this was not the case. Such alpha-amino aliphatic acids were completely ineffective. We previously found, however, that some straight chain omega-amino acids uniquely exhibited an anticoccic activity. In these amino acids there appeared to be a relationship between antimicrobial activity and the length of the carbon chain between the amino and carboxyl groups. Accordingly we theorized that the carboxyl groups may not be absolutely essential. This led to the discovery that certain amino sulfonic acids can be used.

DETAILED DESCRIPTION OF THE INVENTION

The processes of infection leading to disease are accepted to be a problem in the ecology of the parasite. It is being increasingly realized that the bacterial and host determinants are closely interrelated. Thus in vitro experiments indicate that the amino sulfonic acids contemplated herein do not alter the biochemical characteristics of the organism. The tests showed that these compounds do not kill the organism. Surprisingly, in the system of the host they create an environment in which the organism apparently cannot grow. The compositions of this invention thus constitute a new class of antimicrobials. Hence it is contemplated that they will be administered periodically orally, or by intramuscular injection at fairly frequent intervals to mammals in need of an antimicrobial effective in protecting against cocci and bacilli.

The antimicrobials contemplated herein are 2-aminoethane sulfonic acid ($H_2NCH_2CH_2SO_3H$) known as taurine, and 2-amino-3-sulfopropanoic acid ($HOOCCH(NH_2)CH_2SO_3H$) called cysteic acid.

The antistaphylococcal activities of these amino sulfonic acids will be apparent from the following test results. Previously compounds such as homocarnosine were given mice subcutaneously for a period of 5 days before the infection, with an interval of 6 to 24 hours between the last drug injection and the organism challenge. However, since amino acids largely disappear from the blood stream relatively rapidly after their subcutaneous administration, in the technique employed herein, a total of 5 mg. of each drug was given subcutaneously in equally divided doses 2 hours before and 4 hours after the injection of *Staphylococcus aureus*.

The strain of *S. aureus* used in the present investigations and termed "original" strain was isolated from an infected tonsil and has been maintained in our laboratory in the lyophilized state. It is penicillin-resistant, is highly chromogenic, ferments a number of sugars, including mannitol, mannose, maltose, lactose, galactose, glucose, and fructose, and produces coagulase, catalase, gelatinase, deoxyribonuclease, phosphatase, urease, and alpha-toxin.

Culture conditions were standardized, and the third subculture from the lyophilized mother culture was used. The subcultures were grown at 37°C. for 24 hours in Staphylococcus Medium 110 (Difco). The organisms from the third subculture were twice washed and suspended in TC Tyrode Solution (Difco), and the concentration was adjusted turbidimetrically, with a nephelometer, for injection into animals. The transmission levels on the scale of the instrument were taken as a reference of the density of the suspensions and were correlated with viable bacterial counts. Animals were inoculated subcutaneously with 0.5 ml. of a suspension having 70 percent transmission or $2 \times 10^8$ organisms by count. This dosage was approximately 1.5 times the $LD_{50}$.

Swiss albino female mice, maintained on the Rockland Mouse Diet, ranging in age from 10 to 14 weeks old, and in weight from 18 to 23 g. were used in all experiments. All mice were randomized for individual experiments. These mice were propagated in our laboratory from stock originally obtained from Texas Inbred Mice Co., Houston, Tex.

The antistaphylococcal effects of the amino sulfonic acids will now be given in tabular form, the mean values and upper and lower limits being those necessary to obtain a significance level of 95 percent, the data being based on a frequency distribution. Percent protection is (mortality control - mortality treated) × 100/(Mortality control) on the fourth day after infection with *S. aureus*.

Antistaphylococcic Activity of Amino Sulfonic Acids

| | | Percent Mortality on 4th Day | | | | | |
|---|---|---|---|---|---|---|---|
| | | Untreated Mice | | | Treated Mice | | |
| Substance | No. of Animals | ean | Upper Limit | Lower Limit | ean | Upper Limit | Lower Limit |
| Taurine | 60 | 83 | 90 | 73 | 35 | 47 | 32 |
| Cysteic acid | 59 | 83 | 90 | 73 | 51 | 62 | 42 |

Dose 5 mg. per mouse F (0.05)

The desirable antistaphylococcal activities of the amino sulfonic acids described herein are apparent from the table. Moreover, as can be seen from the following, all of the amino sulfonic acids were more potent than the desirable amino acids, with the exception of Dava, which was similar to taurine.

Comparison of Amino Sulfonic Acids with Amino Acids

| Compound | Percent Protection on 4th Day Mean |
|---|---|
| Taurine | 53 |
| Cysteic acid | 37 |
| Glycine | 12 |
| Beta-Alanine | 12 |
| Gaba | 32 |
| Dava | 51 |
| Eaca | 33 |

Gaba, gamma-aminobutyric acid; Dava, delta-aminovaleric acid; Eaca, epsilon-aminocaproic acid.

The compositions of this invention thus constitute significant new antimicrobials. It is contemplated that they will be taken during periods where contact with staphylococci, streptococci or Salmonella typhi infections are likely, such as on entering a hospital. The amino sulfonic acids can be taken orally, for instance, in 250 to 500 mg. tablets, or as injections of, say, 150 to 500 mg. The amino sulfonic acid can also be combined with an aqueous medium, vegetable oil, monoglyceride or diglyceride vehicle for injection, sodium chloride being used if necessary to render the solution isotonic. The solution will contain 0.1 to 1.5 percent by weight, of the amino sulfonic acid.

Suitable colorants, adhesives, and lubricants can be incorporated in the tablets, if desired, along with a solid pharmaceutical diluent, for instance, starches, lactose, sucrose and other pharmaceutical diluents. These tablets will contain 0.08 percent to 5 weight percent of the amino sulfonic acid, preferably 0.08 percent to 1.3 weight percent. Capsules can also be made.

A process is thus provided for the control of infections in humans and other mammals due to cocci and bacilli, which involves administering to the mammal suffering from the infection an effective amount of the amino sulfonic acid. In addition variations and modifications will occur to those skilled in the art. Such ramifications are deemed to be within the scope of this invention.

What is claimed is:

1. A method of treating *Salmonella typhi* and *Staphylococcus aureus* infections in mammals comprising administering to a mammal suffering from said infection an antibacterial effective amount of cysteic acid.

2. The method of claim 1 wherein the bacterial infection is due to *Salmonella typhi*.

3. The method of claim 1 wherein the bacterial infection is due to *Staphylococcus aureus*.

* * * * *